Dec. 30, 1947.   J. W. SHERA   2,433,533
WORK POSITIONING GAGES FOR PUNCH PRESSES OR THE LIKE
Filed April 4, 1944
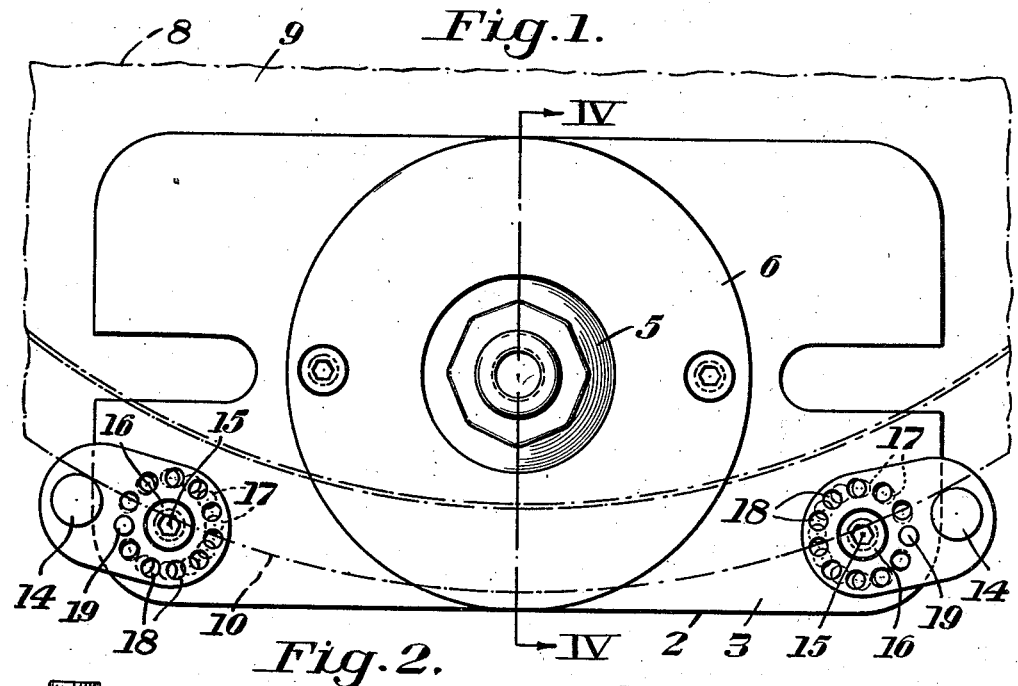
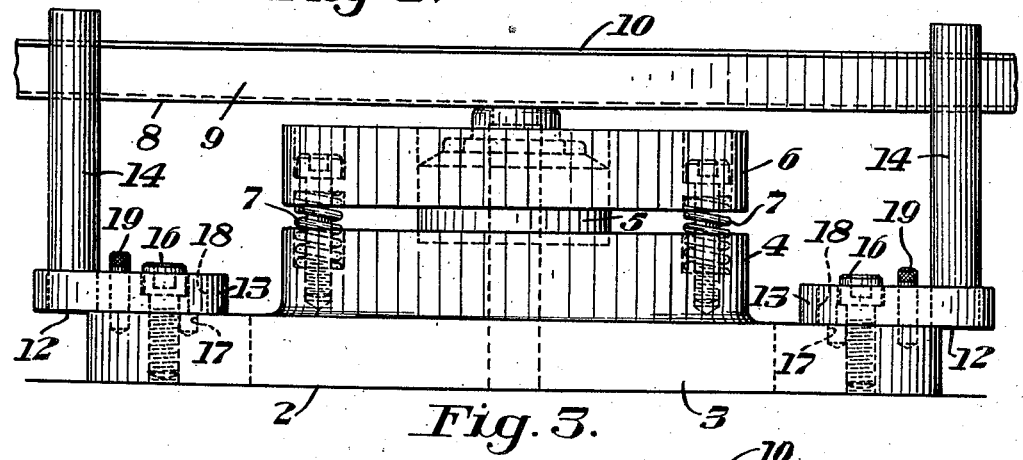
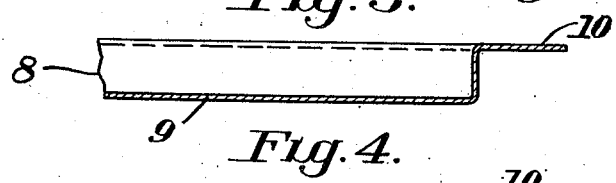
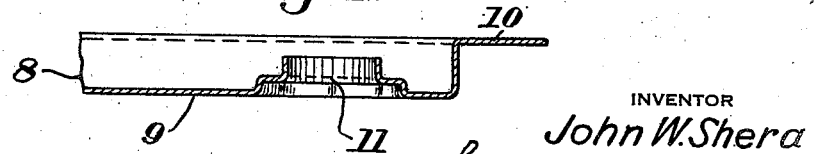
INVENTOR
John W. Shera Patented Dec. 30, 1947

2,433,533

UNITED STATES PATENT OFFICE 2,433,533

WORK POSITIONING GAGE FOR PUNCH PRESSES OR THE LIKE

John W. Shera, Pittsburgh, Pa., assignor of one-half to McDowell Manufacturing Company, Pittsburgh, Pa., a corporation of Pennsylvania Application April 4, 1944, Serial No. 529,545

1 Claim. (Cl. 113—38)

This invention relates to work positioning gages for punch presses or the like, and particularly to work positioning gages for punch presses or the like having means for positioning work relatively to a base member, such, for example, as a die member or other device for operating on the work. The invention provides extremely simple and inexpensive but highly useful and effective positioning devices or work guides which have great utility in the positioning of work to be operated on in a punch press or the like.

One use to which I have put my positioning device illustrates its utility and advantages. In the application of flanges to drum heads it is necessary that the heads be accurately positioned with respect to the flange applying dies. Ordinarily two such dies are employed, the first of which perforates and preliminarily forms the metal of the drum head to form a flange seat and a tubular neck about the perforation and the second of which presses the flange into the seat and through the tubular neck and deforms the metal of the flange over the end of the neck to fasten the flange in place. As each drum head is presented in turn to successive dies, and particularly as the flanges ordinarily employed are non-circular (being generally octagonal), it is essential that the drum head assume substantially exactly the same position with respect to the second die as with respect to the first die. To insure bringing this about it has been customary to provide positioning devices in the form of work guides or gages having positioning means against which the edge of the drum head is positioned during each of the operations. Ordinarily two of these gages are used in connection with each die, the rim of the drum head being placed by the operator against the two gages in positioning the drum head relatively to the die.

In the performance of the operations above mentioned incident to the application of flanges to drum heads the operators work rapidly and bring the drum heads to bear against the gages or work guides with considerable force. The gages are made adjustable to meet different conditions and to enable their use with drum heads of different diameters and it is important that they maintain their adjustment despite the rough usage to which they are subjected. It has been customary to employ gages each having a portion adapted to overlie the die block and an upstanding positioning pin against which the rim of the drum head is placed to position the drum head during the operation being performed thereon. The gage has been bolted to the die block by a single bolt offset from the positioning pin, adjustment of the gage being effected by loosening the bolt, turning the gage to the desired adjusted position about the axis of the bolt and then tightening the bolt. Despite all precautions the bolts have become loose or at least have not always held the gages tightly enough to insure maintaining them in precise adjusted positions, with the result that work has been spoiled and has had to be scrapped.

My positioning device insures maintenance of each work gage in desired adjusted positions despite the rough usage to which it is subjected. Even should the bolt holding the gage in place on the die block become loose, the gage will still maintain proper adjustment.

I provide, in a punch press or the like, a base member, a positioning member carrying positioning means for positioning relatively to the base member work to be operated on in the punch press or the like, the positioning member being rotatively adjustable relatively to the base member about an axis spaced from the positioning means, each of said members having a series of positioning portions disposed about said axis, the positioning portions of one of the members being spaced apart slightly farther than those of the other member so that for each of a plurality of relative positions of said members a positioning portion of one lies in cooperative relationship with a positioning portion of the other, and means engaging said positioning portions lying in cooperative relationship to maintain said members in said relative position. Preferably the positioning portions are disposed equidistantly from said axis so that for each adjusted position of the positioning member relatively to the base member a positioning portion of one of the members lies opposite a positioning portion of the other in a direction parallel to said axis. Preferably the positioning portions are in the form of openings in the base member and positioning member and preferably the means for maintaining the members in relative position constitutes a pin entering said openings.

I find it desirable to provide in one of the members, preferably the base member, a series of sockets disposed about the axis about which the members are relatively rotatively adjustable and in the other, preferably the positioning member, a series of holes disposed about said axis, with the spacing between the sockets being slightly different than the spacing between the holes, so that for each of a plurality of relative positions of said members a socket of one lies in cooperative relationship with a hole of the other. Desirably such socket and hole are coaxial to receive a straight pin, and it is also desirable that the axis of the pin when in operative position be parallel to the axis of relative rotative adjustment between the base member and the positioning member.

The positioning portions of the base member and positioning member are preferably arranged in circles whose centers lie in the axis of relative rotative adjustment between said members. The number of positioning portions of the base member is preferably different, desirably by one, than the number of positioning portions of the positioning member. For example, the base member may have twelve sockets equally spaced from one another in a circle and the positioning member may have eleven holes also equally spaced from one another in a circle. With such an arrangement there are 132 different positions in which the positioning member may be fastened relatively to the base member. Thus means are provided for positively holding the positioning member in desired adjusted position relatively to the base member in different positions very close together.

Other details, objects and advantages of the invention will become apparent as the following description of a present preferred embodiment thereof proceeds.

In the accompanying drawings I have shown a present preferred embodiment of the invention, in which Figure 1 is a plan view of a portion of a punch press or the like including die mechanism for the application of flanges to drum heads and means for positioning the drum heads relatively to the dies during such operation;

Figure 2 is an elevational view of the mechanism shown in Figure 1;

Figure 3 is a fragmentary central vertical cross-sectional view through a drum head before it is acted on by the dies; and Figure 4 is a view similar to Figure 3, taken on the line IV—IV of Figure 1, showing the drum head after it is acted on by the dies.

Referring now more particularly to the drawings, there is provided a punch press or the like including die mechanism which may be of conventional or any desired structure and which is designated generally by reference numeral 2. The die mechanism comprises a base 3 having integral therewith and projecting upwardly therefrom a die support 4 carrying a die 5. A compression ring or stripper 6 is guided for vertical movement relatively to the support 4 in conventional manner, being urged upwardly by springs 7. A drum head designated generally by reference numeral 8 comprises a body portion 9 and a peripheral flange 10. The drum head is presented to the die 5 with the flange 10 uppermost, as shown in Figure 2, where it is acted on between the die 5 and a complementary die member (not shown) to perforate and deform the body portion 9 as shown at 11 in Figure 4.

The drum head is positioned relatively to the die 5 by gages designated generally by reference numeral 12, two of such gages being employed which cooperate with each other to position the work. The structure of the gages is identical, so description of one will suffice for both.

Each of the gages 12 comprises a generally horizontal connecting portion 13 adapted to lie upon the upper surface of the die base 3 and a guide pin 14 projecting upwardly from the portion 13. The gage 12 is rotatively adjustable relatively to the die base 3 about an axis 15 spaced from the axis of the pin 14. A bolt 16 coaxial with the axis 15 passes through a hole in the portion 13 and threads into the die base and when tightened serves to hold the gage down on the die base. However, as pointed out above, such a bolt cannot be relied upon to hold the gage accurately in desired adjusted positions. To insure holding of the gage accurately in desired adjusted positions the means now to be described is provided.

The die base 3 is provided with a series of openings or sockets 17 disposed with their axes vertical or parallel to the axis of the threaded hole receiving the bolt 16, the sockets 17 being arranged in a circle about the axis of the bolt hole and being equally spaced from one another. The portion 13 of the gage 12 is provided with a series of holes 18 disposed with their axes vertical or parallel to the axis 15 of the hole in the portion 13 through which the bolt 16 passes, the holes 18 being arranged in a circle about such axis and being equally spaced from one another. The number of sockets 17 is unequal to the number of holes 18. Preferably the number of such sockets differs from the number of such holes by one and in the form of structure shown in the drawings there are twelve sockets 17 and eleven holes 18. Since the sockets are equally spaced apart and the holes are equally spaced apart and the diameters of the circles in which the sockets and holes are arranged are the same it follows that the distance between adjacent sockets is not the same as the distance between adjacent holes but is somewhat less.

A pin 19 is provided which in each of a plurality of adjusted positions of the gage relatively to the die is adapted to pass through one of the holes 18 and enter one of the sockets 17 as shown in Figure 2. In that figure no attempt has been made to show all of the sockets 17 and holes 18 as this would result in an unreadable mass of lines. All of the sockets and all of the holes are shown in Figure 1, which figure clearly brings out their relationship.

The gage may be turned about the axis of the bolt hole to desired adjusted positions, this being provided for by loosening the bolt 16 so that the gage is free to turn relatively to the die base. When the gage is arranged in the position desired the pin 19 is applied to enter the hole 18 and socket 17 which are then in vertical alignment. A hole 18 and socket 17 will be in vertical alignment for each of a large number (132) of adjusted positions of the gage and hence for virtually any relative position between the gage and die base in which the gage may be arranged. Very slight turning of the gage in one direction or the other may be necessary in order to bring a hole 18 and a socket 17 precisely into vertical alignment, but for most purposes the accuracy of adjustment with the construction shown is sufficient. If finer adjustment is desired a greater number of sockets 17 or holes 18 or both may be provided.

With my positioning device the gage is held in adjusted position even should the bolt 16 loosen, as the bolt 16 and the pin 19 cooperate in positioning the gage and the gage cannot move out of adjusted position without shearing the pin 19.

While I have shown and described a present preferred embodiment of the invention it is to be distinctly understood that the invention is not limited thereto but may be otherwise variously embodied within the scope of the following claim.

I claim:

In a press for operating on work, a base member, a plurality of gages for cooperatively positioning in the press work to be operated on therein, each gage having a positioning pin adapted to engage and position the work, each gage being rotatively adjustable relatively to the base member about an axis spaced from the positioning pin thereof, the base member having a series of equally spaced positioning portions disposed about each such axis, each gage having a series of equally spaced positioning portions disposed about the axis about which it is rotatively adjustable relatively to the base member, the positioning portions of each series in the base member being spaced apart distances slightly different than the distances of spacing apart of the positioning portions in the corresponding gage so that for each of a plurality of relative positions of each gage and the base member a positioning portion of one lies in cooperative relationship with a positioning portion of the other, and means engaging said positioning portions lying in cooperative relationship to maintain the gages and base member in said relative positions and hence to adjustably locate the positioning pins to position work to be operated on.

JOHN W. SHERA.

REFERENCES CITED

The following references are of record in the file of this patent:

UNITED STATES PATENTS

| Number | Name | Date |
| --- | --- | --- |
| 1,782,999 | Parker | Nov. 25, 1930 |
| 372,784 | Bayrer | Nov. 8, 1887 |
| 2,189,086 | Seagren | Feb. 6, 1940 |
| 1,928,383 | Leet et al. | Sept. 26, 1933 |
| 1,313,277 | Elder | Aug. 19, 1919 |
| 1,482,528 | Stone | Feb. 5, 1924 |
| 1,720,422 | Manville | July 9, 1929 |